United States Patent
Coyle et al.

(10) Patent No.: US 11,153,078 B2
(45) Date of Patent: Oct. 19, 2021

(54) EXTENSIBLE SYSTEM FOR AUTHENTICATED AND PROTECTED KEY AGREEMENT IN LARGE MESH LAYER 2 ETHERNET NETWORKS

(71) Applicant: Raytheon Company, Waltham, MA (US)

(72) Inventors: Michelle D. Coyle, Marblehead, MA (US); Steven C. Gerhold, Wake Forest, NC (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/962,359

(22) PCT Filed: Jan. 15, 2019

(86) PCT No.: PCT/US2019/013586
§ 371 (c)(1),
(2) Date: Jul. 15, 2020

(87) PCT Pub. No.: WO2019/143591
PCT Pub. Date: Jul. 25, 2019

(65) Prior Publication Data
US 2020/0351085 A1 Nov. 5, 2020

Related U.S. Application Data

(60) Provisional application No. 62/617,865, filed on Jan. 16, 2018.

(51) Int. Cl.
*H04L 9/08* (2006.01)
*H04L 29/06* (2006.01)
*H04L 29/08* (2006.01)

(52) U.S. Cl.
CPC .......... *H04L 9/0833* (2013.01); *H04L 9/0838* (2013.01); *H04L 9/0891* (2013.01);
(Continued)

(58) Field of Classification Search
CPC ... H04L 9/0833; H04L 9/0838; H04L 9/0891; H04L 63/0435; H04L 63/065;
(Continued)

(56) References Cited

U.S. PATENT DOCUMENTS 7,586,888 B2 9/2009 Wang
7,804,807 B2 9/2010 Korus et al.
(Continued)

FOREIGN PATENT DOCUMENTS

WO 02087168 A2 10/2002

OTHER PUBLICATIONS

"IEEE/ISO/IEC Information Technology—Telecommunications and Information Exchange Between Systems—Local and Metropolitan Area Networks—Part 1X: Port-Based Network Access Control" ISO/IEC/IEEE 8802-1X:2013(E); IEEE Standard, IEEE, Dec. 12, 2013 (222 pages).

(Continued)

*Primary Examiner* — Techane Gergiso
(74) *Attorney, Agent, or Firm* — Cantor Colburn LLP

(57) ABSTRACT

A large-scale Ethernet mesh network is provided, which includes a group connectivity association (CA) including at least thirty-one authenticated supplicant nodes. An authenticator module authenticates each of the authenticated supplicant nodes, and distributes a shared group encryption key to each of the authenticated supplicant nodes. Each of the authenticated supplicant nodes encrypt data using the shared group encryption key, and exchange the encrypted data with any other remaining authenticated supplicant node.

16 Claims, 3 Drawing Sheets

(52) U.S. Cl.
CPC ........ *H04L 63/0435* (2013.01); *H04L 63/065* (2013.01); *H04L 63/068* (2013.01); *H04L 63/0869* (2013.01); *H04L 63/162* (2013.01); *H04L 67/12* (2013.01)

(58) Field of Classification Search
CPC . H04L 63/068; H04L 63/0869; H04L 63/162; H04L 67/12; H04W 12/0431; H04W 12/0433; H04W 12/0471
See application file for complete search history.

(56) References Cited

U.S. PATENT DOCUMENTS

| | | | | |
|---|---|---|---|---|
| 8,386,772 | B2* | 2/2013 | Guan | H04L 63/162 713/154 |
| 10,637,865 | B2* | 4/2020 | Hussain | H04L 63/06 |
| 10,686,595 | B2* | 6/2020 | Chimakurthy | H04L 63/0869 |
| 2005/0125692 | A1 | 6/2005 | Cox et al. | |
| 2005/0226248 | A1* | 10/2005 | Modi | H04L 67/42 370/395.5 |
| 2007/0206537 | A1* | 9/2007 | Cam-Winget | H04W 12/06 370/331 |
| 2007/0253376 | A1 | 11/2007 | Bonta et al. | |
| 2008/0043686 | A1* | 2/2008 | Sperti | H04L 63/1408 370/338 |
| 2009/0116647 | A1* | 5/2009 | Korus | H04W 12/041 380/272 |
| 2010/0309878 | A1* | 12/2010 | Stolyar | H04W 88/005 370/331 |
| 2011/0264915 | A1 | 10/2011 | Cam-Winget et al. | |
| 2014/0093072 | A1* | 4/2014 | Biradar | H04L 63/068 380/44 |
| 2016/0036813 | A1* | 2/2016 | Wakumoto | H04L 63/0272 713/171 |
| 2021/0176255 | A1* | 6/2021 | Hill | H04L 9/3239 |

OTHER PUBLICATIONS

Das et al., "Performance of Jumbo Sized Data on Jumbo Frame and Ethernet Frame Using UDP over IPv4/IPv6" 2013 2nd International Conference on Advanced Computing, Networking and Security. IEEE, (Dec. 2013) pp. 204-207.

International Search Report and Written Opinion for International Application No. PCT/US19/013586; Application Filing Date Jan. 15, 2019; dated Apr. 8, 2019 (14 pages).

* cited by examiner

EXTENSIBLE SYSTEM FOR AUTHENTICATED AND PROTECTED KEY AGREEMENT IN LARGE MESH LAYER 2 ETHERNET NETWORKS

CROSS-REFERENCE TO RELATED APPLICATIONS

This application is a National Stage of International Application Serial No. PCT/US2019/013586, filed Jan. 15, 2019, which claims priority to U.S. Provisional Application Ser. No. 62/617,865, filed Jan. 16, 2018, the contents of which are hereby incorporated by reference in its entirety.

BACKGROUND

Various non-limiting embodiments relate generally to local area networks, and more particularly, to mesh networking topologies.

Mesh networking topologies have gained interest in recent years due to their robustness and ability to continue operating should one or more nodes fail. For instance, peer devices or supplicant nodes (referred to herein simply as supplicants) gain access to the mesh node (i.e., are authenticated) using pre-shared authentication keys. Once a supplicant is authenticated, it can connect directly, dynamically and non-hierarchically to any other authenticated supplicant included in the mesh network. In this manner, the authenticated supplicants can cooperate with one another to efficiently exchange data.

However, unlike other communication networking topologies such as point-to-point topologies where each device or node requesting access to the network is provided a different authenticated key, a mesh network uses a single shared group encryption key to facilitate secure communication between all supplicants authenticated to participate in the group connectivity association (CA).

In addition, mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs.

Mesh networks can be implemented as a wired network such as an Ethernet-based mesh network, for example. Conventional mesh networks are governed according to the standards defined by Institute of Electrical and Electronics Engineers (IEEE) 802.1X-2010. However, the protocol defined by IEEE 802.1X-2010 limits a conventional mesh network to employing no more than 30 nodes.

SUMMARY

According to a non-limiting embodiment, a large-scale Ethernet mesh network is provided, which includes a group connectivity association (CA) including at least thirty-one authenticated supplicant nodes. An authenticator module authenticates each of the authenticated supplicant nodes, and distributes a shared group encryption key to each of the authenticated supplicant nodes. Each of the authenticated supplicant nodes encrypt data using the shared group encryption key, and exchange the encrypted data with any other remaining authenticated supplicant node.

According to another non-limiting embodiment, a method of exchanging secured data in a large-scale Ethernet mesh network is provided. The method comprises authenticating, via an authenticator module, at least thirty-one supplicant nodes to establish a group connectivity association (CA), and distributing, via the authenticator module, a shared group encryption key to each of the authenticated supplicant nodes. The method further comprises encrypting data, via at least one sending supplicant node included among the authenticated nodes, using the shared group encryption key; and exchanging the encrypted data from the at least one sending supplicant node to at least one receiving supplicant node included among the authenticated nodes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Described herein is an extensible system that facilitates authenticated and protected key agreements in large mesh layer 2 Ethernet networks, which in turn allows for increasing the number of Ethernet encryption devices that can be implemented in the mesh network to upwards of one-hundred peer devices. In one or more embodiments, a large-scale Ethernet-based mesh network is provided which is capable of operating according to the IEEE 802.1X-2010 standards. In this manner, port-based network access control can be performed to restrict the use of an IEEE 802 local area network (LAN) connection between authenticated and authorized device peers while also authorizing devices and securing communications using IEEE 802.1AE-2006 Media Access Control Security (MACsec) over Layer 2 Ethernet networks. Unlike conventional mesh networks, which are limited to no more than 30 nodes (i.e., peer devices) under the IEEE 802.1X-2010 standard, the large-scale Ethernet-based mesh network described herein can support authenticated and protected key agreements for a large-scale mesh topology comprising more than one-hundred peer devices.

Various non-limiting embodiments described herein implement innovative design functions and system operations not found in current mesh network protocol specifications such as, for example, IEEE 802.1X-2010. The innovative functions and operations implemented in the large mesh layer 2 Ethernet network described herein include, but are not limited to, modified uncontrolled ports and modified MACsec common ports, a newly designed IEEE 802.1X-2010 control port state machine, a modified MACsec Key Agreement (MKA) protocol, and a newly designed peer management module, also referred to as an authenticator module. These innovative functions and operations can be performed in parallel such that a large mesh layer 2 Ethernet network according to one or more non-limiting embodiments is capable of substantially exceeding the current number of maximum peer devices (e.g., 30 devices) set by conventional mesh topology protocols (e.g., IEEE 802.1X-2010). Accordingly, the large-scale Ethernet-based mesh network described herein can achieve expected cryptographic performance requirements necessary to perform large-scale mesh networking authentication, key derivation and key distributions for a mesh network containing over one-hundred peer devices.

Figure 1:
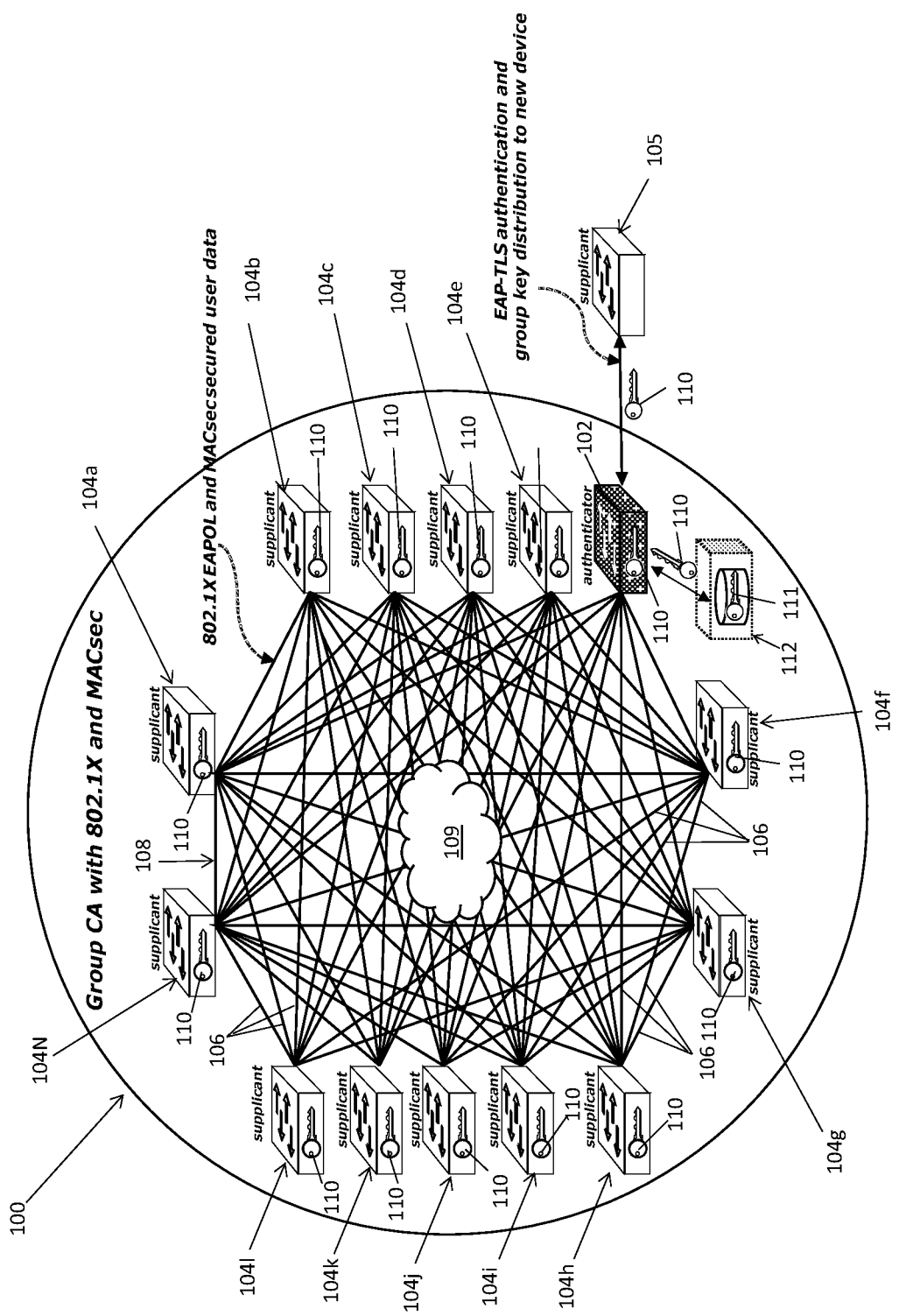
FIG. 1 is a diagram of a large-scale Ethernet mesh network according to a non-limiting embodiment.

With reference now to FIG. 1, a large-scale Ethernet mesh network 100 is illustrated according to a non-limiting embodiment. The large-scale Ethernet mesh network 100 includes an electronic authenticator module 102 and a plurality of authenticated electronic supplicant nodes 104a-104N. In one or more embodiments, the large-scale Ethernet mesh network 100 is constructed as a large mesh layer 2 Ethernet network and is configured to manage authenticated and protected key agreements between a plurality of Ethernet encryption devices 104a-104N (referred to herein as supplicant nodes 104a-104N). Although the large-scale Ethernet mesh network 100 is illustrated as including thirteen authenticated supplicant nodes 104a-104N, the large-scale Ethernet mesh network 100 is not limited there to, and in fact can include upwards of one-hundred supplicant nodes 104N.

Each authenticated supplicant node 104a-104N establishes a plurality of secured data links 106 between one another, which allows for the exchange of secured user data such as, for example, 802.1X EAPoL and MACsec secured user data. The collection of data links 106 defines a group CA 108 of service access points secured by a shared group key to form a local area network (LAN) 109 such as, for example, a LAN cloud network. In one or more embodiments, the group CA 108 operates according to IEEE 802.1X and MACsec protocols. Any one of the authenticated supplicant nodes 104a-104N can be constructed as an electronic hardware controller that includes memory and a processor configured to execute algorithms and computer-readable program instructions stored in the memory.

The supplicant nodes 104a-104N each use a shared traffic key known as a Secure Association Key (SAK) 110, which serves as a shared group encryption key that secures the data through the secured data links 106 of the mesh network 100. Candidate supplicants 105 requesting authorization to join the group CA 108 do not possess the current SAK 110 until they are authenticated as described below. Once becoming an authenticated member of the group CA 108, each supplicant 104 performs a MKA peer liveliness operation, which involves outputting a beacon signal (sometimes referred to as a "heartbeat message") at predetermined time intervals (e.g., every two seconds). The heartbeat message generated by each supplicant node 104a-104N contains, among other information, a member identifier (ID) that is unique to the individual supplicant nodes 104a-104N. In this manner, the heartbeat messages allow every authenticated supplicant node 104a-104N to determine the number of live authenticated supplicant nodes 104a-104N currently present in the group CA 108.

In at least one embodiment, the supplicant nodes 104a-104N are configured to support jumbo frames in order to generate the heartbeat message containing, among other data, live peer information indicating the current number of nodes (i.e., supplicants 104a-104N and authenticator module 102) currently operating in the group CA 108. Jumbo frames are referred to as Ethernet frames capable of supporting a larger payload that standard Ethernet frames. For example, a standard Ethernet frame supports only 1,500 bytes of payload on a port (i.e., has a maximum transmission unit (MTU) of 1,500 bytes), and therefore cannot be utilized to generate the larger MKA heartbeat messages necessary to maintain functionality of an Ethernet-based mesh network containing more than 30 nodes. Jumbo frames, however, have an MTU that exceeds the standard Ethernet frame. In one or more embodiments, the mesh network 100 can support a jumbo frame having a MTU, for example, of over 1,500 bytes (e.g., 9,000 bytes) of payload on the port. In this manner, the nodes (e.g., the authenticated supplicant nodes 104a-104N and the authenticator module 102) can use jumbo frames to generate heartbeat messages taking into account the substantially large number of live authenticated devices that can operate in the large-scale Ethernet mesh network 100 at a given time.

The SAK 110 is generated by a key server 112. In one or more embodiments, the key sever 112 is constructed as a hardware controller and is configured to derive the SAK from a Connectivity Association Key (CAK) 111. The derived SAK 110 is then provided to the authenticator module 102 for group distribution. Although the key server 112 is illustrated as being an independent device, other embodiments integrate the key server 112 together with the authenticator module 102.

The authenticator module 102 can be constructed as a hardware controller, and is configured to perform various access and authentication measures to manage candidate supplicants 105 requesting authorization to access the group CA 108. The authentication of the supplicant nodes 104a-104N can be performed according to Extensible Authentication Protocol-Transport Layer Security (EAP-TLS), which is an EAP type supported by certificate-based security environments. The EAP-TLS exchange of messages provides mutual authentication, negotiation of the encryption method, and encrypted key determination between the remote access client and the authenticator. The EAP-TLS protocol utilizes a Port Access Control Protocol (PACP) state machine, which can be constructed as state machine circuit configured to monitor the packet exchanges between a candidate supplicant 105 requesting authentication and the authenticator module 102 to determine a successful authentication. As the number of authenticated supplicant nodes 104N increases, the data traffic relayed to the authenticator module 102 also increases.

The EAP-TLS protocol also utilizes authentication timers, which monitors the communication exchange between a candidate supplicant 105 and the authenticator module 102. If an authentication does not complete within a set time interval, a re-authentication procedure can be repeated. As mentioned above, however, the authenticator module 102 can realize an increase in traffic load as more supplicant nodes 104N are added to the group CA 108, causing a delay in the authentication procedure and the possibility of invoking a repeat authentication procedure. In one or more embodiments, the time interval of one or more authentication timers can be dynamically or actively adjusted based on the varying membership of the group CA 108. In another embodiment, the authentication timers are configurable and can be set to a fixed non-standard time interval that takes into account a large peer membership (e.g., over 100 supplicant nodes). In another embodiment, a sender SM (i.e., the SM included in a supplicant node sending secured data) actively implements a fixed and configurable backoff time interval, as the number of authenticated supplicant nodes 104a-104N included in the group CA 108 changes. In this manner, the authentication process between a candidate supplicant 105 and the authenticator module 102 can be carried out in an adequate time interval regardless as to the added load applied to the authenticator module 102 caused by the changing membership of the group CA 108.

The authenticator module 102 also executes group key distribution operations to distribute the derived SAK 110 to the authenticated supplicant nodes 104a-104N and the candidate supplicants 105 (once authenticated). Because all authenticated supplicant nodes 104a-104N possess the same SAK 110, the SAK 110 is referred to as a shared group key 110, which allows for securing the data through the data links 106 of the mesh network 100. In one or more embodiments, the authenticator module 102 can distribute a new SAK 110 to each authenticated supplicant node 104a-104N based on network timing schedule. That is, the authenticator module 102 can be programmed to distribute a new SAK 110 to each authenticated supplicant node 104a-104N based on scheduled time intervals set by the local policy of the network 100. In one or more embodiments, the key server 112 generates a new SAK 110 based on the CAK 111 in response to a group key change event. In one or more embodiments the group key change evening includes a change to the group CA membership. For example, the authenticator module 102 can detect a group key change event each time a candidate supplicant 105 is added to the group CA 108 and/or an authenticated supplicant node 104a-104N leaves the group CA 108. Once generated, the new SAK 110 is distributed by the authenticator module 102 to all authenticated supplicant modules 104a-104N, which is then used to encrypt and decrypt the data sent on the data links 106.

Figure 2:
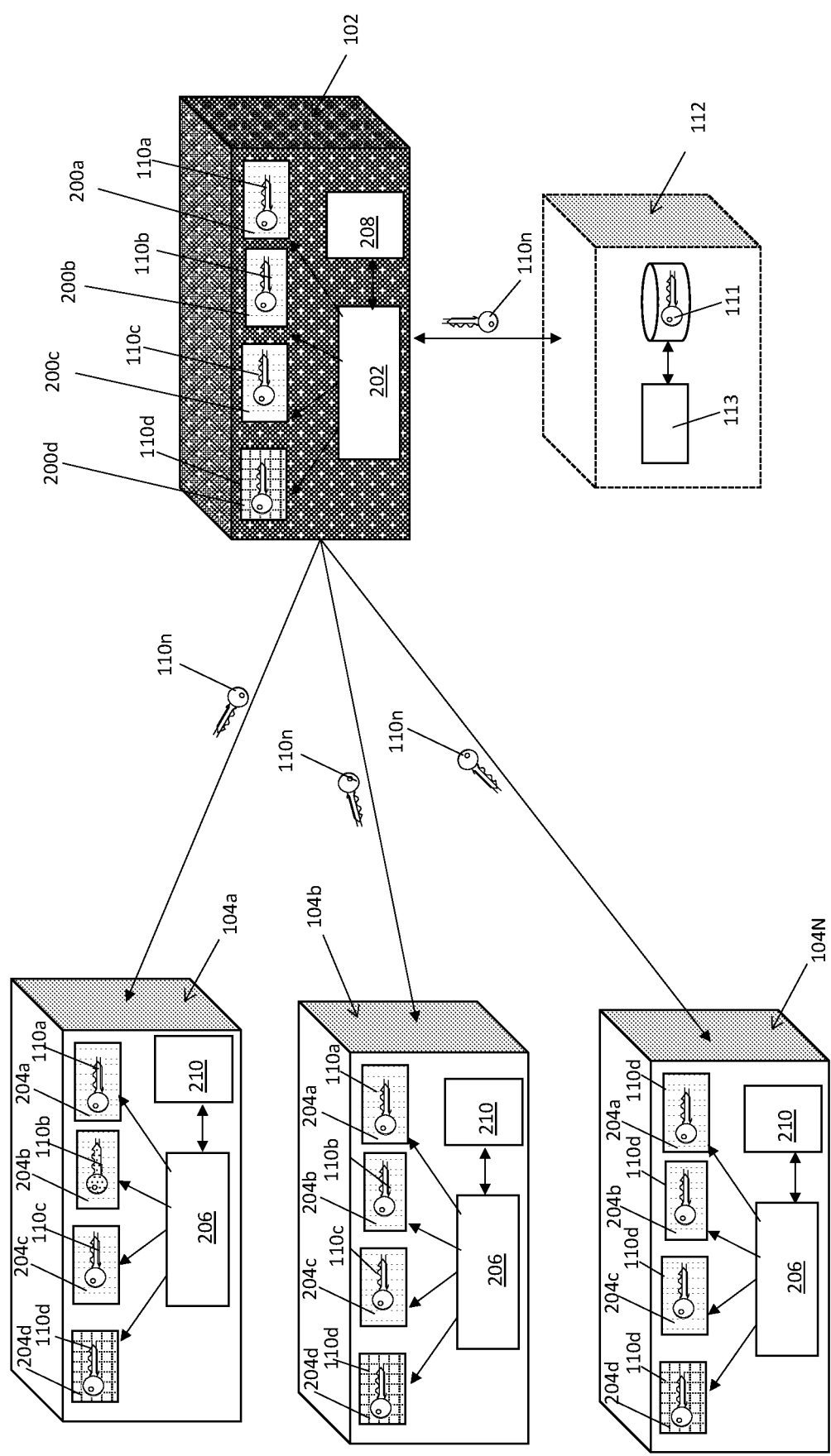
FIG. 2 is a block diagram of an authenticator module in electrical communication with a plurality of authenticated supplicant nodes according to a non-limiting embodiment.

Turning to FIG. 2, the authenticator module 102, key server 112 and authenticated supplicant nodes 104a-104N are illustrated in greater detail. The authenticator module 102 includes a plurality of storage areas or sender key slots 200a, 200b, 200c and 200d, along with a sender controlled port (CP) state machine (SM) 202. Each authenticated supplicant node 104a-104N includes a plurality of receiver key slots 204a, 204b, 204c and 204d, along with a receiver CP SM 206. The sender key slots 200a-200d are configure to store a different group SAK 110a, 110b, 110c and 110d provided by the key server 112. The sender CP SM 202 and the receiver CP SMs 206 can be constructed as state machine circuits.

As described above, the key server 112 stores a CAK 111 which serves as a master encryption key of sorts. Based on the CAK 111, the key server 112 generates a group SAK 110n which is then delivered to the authentication module 102. In one or more embodiments, key server 112 can generate different SAKs 110n. For instance, a change in the group CA membership (i.e., an addition or removal of a supplicant) can cause the key server 112 to generate a new SAK 110n.

The authentication module 102 receives the SAK 110n and utilizes the sender CP SM 202 to sequentially select one of the sender key slots 200a, 200b, 200c and 200d in which to store the received SAK 110n. An initial SAK 110a, for example, can be stored in slot 200a. Subsequent SAKs i.e., group keys 110b-110d, are then sequentially stored in the remaining sender key slots 200b-200d, respectively, based on the operation of the sender CP SM 202. In this example, the SAK 110d stored in sender slot 200d is designated as the most up-to-date SAK 110d to be used to encrypt and decrypt data exchanged through the large-scale Ethernet mesh network 100. The authentication module 102 communicates with the sender CP SM 202 to determine the most up-to-date SAK 110d. Once the most up-to-date SAK 110d is identified, the authentication module 102 selects it as the group key to be shared among each supplicant node 104a-104N included in the group CA, and distributes the shared SAK 110d to each authenticated supplicant node 104a-104N accordingly.

The supplicants 104a-104N utilize their receiver CP SMs 206 in a similar manner as described above. For example, the initial SAK 110a received from the authenticator module 102 can be stored in slot 204a. The operation of the receiver CP SM 206 then operates to sequentially store subsequently received SAKs i.e., 110b-110d, in the remaining sender key slots 204b-204d, respectively. The CP SM 206 also manages the "cutover" or transition from one slot to another slot for both the transmitting and receiving operations.

The sender CP SM 202 and the receiver CP SMs 206 can implement a rekey back-off scheme in which the time interval to switch between a currently used SAK 110d and a newly issued SAK 110N is dynamically adjusted based on the number of authenticated nodes 104a-104N currently participating in the group CA 108. In the event the group CA membership changes rapidly, the key server 112 may be forced to rapidly generate different SAKs 110n upon the addition of new authenticated devices to the group CA.

The rapid distribution of new SAK keys 110n can cause unsynchronized key cut overs (i.e., transitions from a first received SAK 110n to a second received SAK 110n) in the authenticated devices, causing one authenticated supplicant node (e.g. 104a) to encrypt data using an initial group key (e.g., SAK 110a), while another authenticated supplicant node (e.g., 104b) attempts to decrypt the data using a subsequently issued group key (e.g. SAK 110b). This unsynchronized key cut over scenario becomes more prevalent as the group CA membership increases, or during transient authentication events such as group CA initiation, or following brief outages of the group CA 108. To prevent this unsynchronized key cut over scenario, the sender CP SM 202 and the receiver CP SMs 206 can increase the time interval at which they will attempt to cut over to the newly assigned SAK 110. Accordingly, the sender CP SM 202 and the receiver CP SMs 206 effectively "back off" or refrain from employing the newly assigned SAK 110 in case a subsequently newly assigned SAK 110 is immediately issued due to a rapid change in the group CA membership (e.g., during group CA initialization).

In one or more embodiments, the sender CP SM 202 and the receiver CP SM 206 are constructed according to non-standard modifications (e.g., non-standard modifications to the IEEE 802.1X protocol), and are configured to operate in conjunction with a modified MKA protocol to support throttling of rekey procedures caused by transient conditions or rapid group membership changes. The throttling operation serves to enforce rekey back-off (e.g., a 2 second time out), which allows the key server 112 to correctly perform queuing of rekey requests, especially during transient conditions such as group CA initialization events which can occur following brief network outages or initial network startup. Accordingly, the key server 112 can queue requests for rekey during a backoff timer condition which once serviced, causes the SAK 110 to be rekeyed.

As described above, the key server 112 can change the SAK 110 following changes (e.g., additions or removals) of authenticated devices (e.g., supplicant nodes 104N) to the group CA 108. Each supplicant node 104N selects a unique member identification (ID) upon authentication, which identifies itself to the various devices (e.g., other authenticated supplicant nodes 104N and/or the authentication module 102) in the group CA 108. The key server 112 includes a member identifier module 113, which maintains and actively updates a membership list which, is a list of all membership IDs sent by the individual devices in the group CA 108. When the key server 112 identifies a new membership ID in the membership list, the member identifier module 113 determines that a new device or candidate supplicant node 105 has been added to the group CA 108. Accordingly, the key server 112 will generate a new SAK 110 based on the CAK 111, and will deliver the new SAK 110 to the authentication module 102, where it is then delivered to all the authenticated devices 104N participating in the group CA 108.

In some instances, however, one or more supplicant nodes 104N and/or the authentication module 102 may detect that the newly generated SAK 110 is a reused key. For example, the device controller 208 and/or 210 can compare a newly distributed SAK 110 to the SAK IDs stored in the key slots 200a-200d and/or 204a-204d, respectively. If the newly distributed SAK 110 having a key ID matches one the key IDs stored in the key slots 200a-200d and/or 204a-204d, one or more devices 102 and/or 104N can detect that the newly distributed SAK 110 is a reused key. In this event, the device itself (i.e., the supplicant nodes 104N and/or the authentication module 102) changes its membership ID. In turn, the key server 112 believes that a new authenticated device has joined the group CA 108, and in response generates another new and different SAK 110. In this manner, the possibility of encrypting data using a reused SAK 110 is greatly reduced, or eliminated completely.

Figure 3:
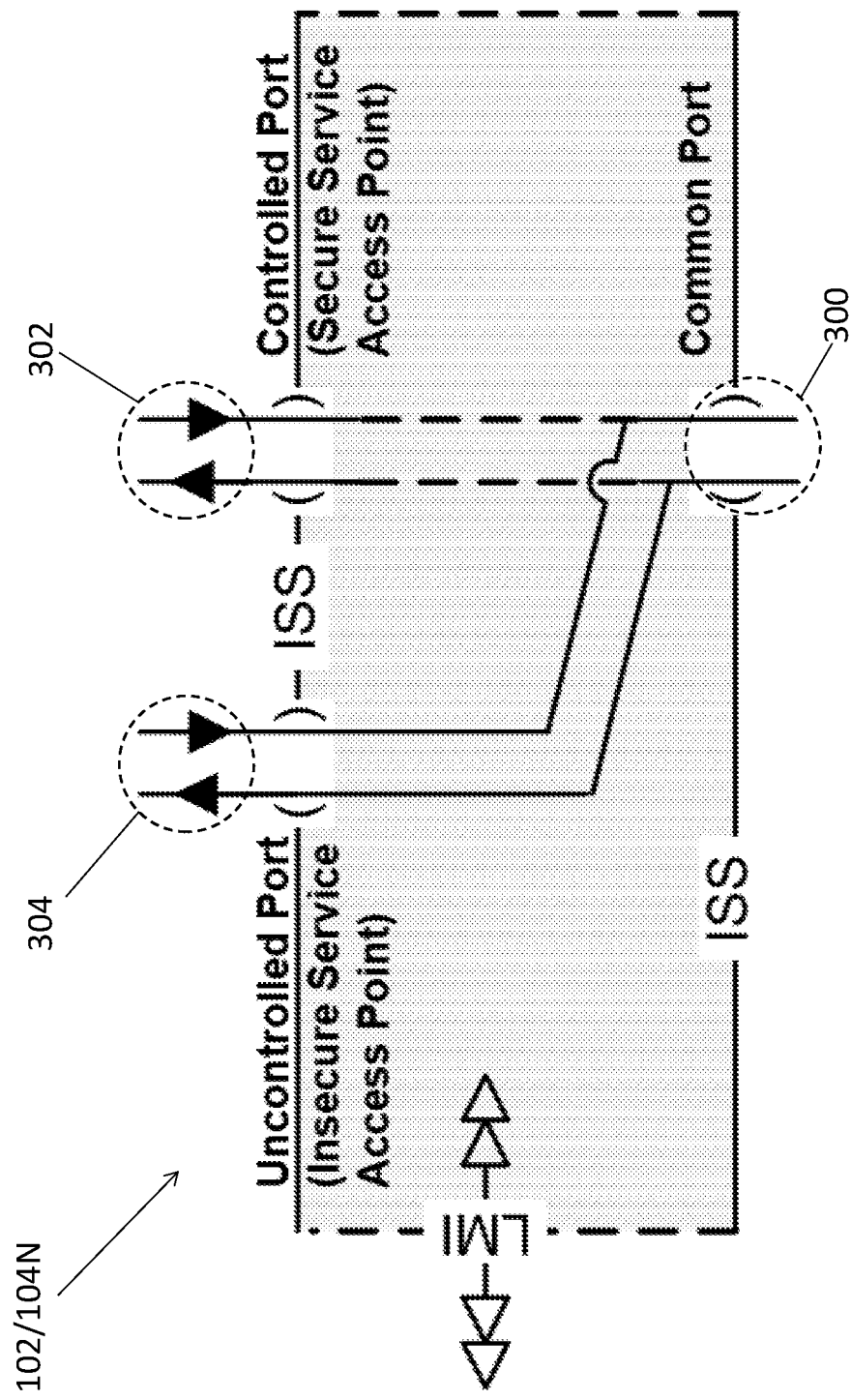
FIG. 3 is a block diagram of a peer device capable of operating in a large-scale Ethernet mesh network according to a non-limiting embodiment.

Referring to FIG. 3, each device (e.g., each supplicant node 104a-104N and the authenticator module 102,) supported by the large-scale Ethernet mesh network 10 includes a common port 300, a controlled port 302, and an uncontrolled port 304. The common port 300 is a secured port (e.g., MACsec port) that is utilized by an underlying service supported by the large-scale Ethernet mesh network 100, and delivers encrypted traffic to the common network (e.g., LAN, cloud, etc.). The controlled port 302 is a secured port which exchanges in the clear or controlled data with the common port 300, and can deliver the encrypted data to the common port 300 as mentioned above. The uncontrolled port 304 is an unsecured internal port, which receives protocol data MKA traffic or EPoL packets from the common port 300 and relays the protocol data to the control plane of the large-scale Ethernet mesh network 100.

In one or more embodiments, the uncontrolled port 304 and MACsec common port 300 are modified to have an increased maximum transmission unit (MTU) size allowing them to handle the exponential growth of peer lists in a large-scale Ethernet-based mesh network because growth in peer membership results in a linear increase in protocol data unit (PDU) transmissions in the group CA 108. In this manner, the newly designed uncontrolled port 304 and modified MACsec common port 300 can overcome the conventional mesh networking topology's lack of Extensible Authentication Protocol over LAN (EAPoL) fragmentation support.

In one or more embodiments, the buffer size of the uncontrolled port 304 is increased commensurate with the buffer size of the common port 300. In this manner, the large-scale Ethernet mesh network 100 is able to handle simultaneous authentication exchanges and MKA transmission for an excessively large device group, e.g., at least one-hundred peer devices (e.g., supplicants 104N and authenticator 102) without dropping packets. For instance, the protocol data delivered through an uncontrolled port 304 increases as the number of authenticated supplicant nodes 104N are added to the group CA 108. Moreover, the uncontrolled port 304 can see an increase in bursts of protocol data as the number of authenticated nodes 104N increases due to the increase in the number authenticated nodes 104N that are sending jumbo frame heartbeat messages at the same synced time interval (e.g., every two seconds). Thus, increasing the buffer size of the uncontrolled port 304 allows the devices (e.g., the authenticated supplicants 104N and the authenticator module 102) to handle these increased bursts in protocol data included in the jumbo frames so as to prevent packet drops and maintain operability of the network 100.

In one or more embodiments, the authenticated supplicants 104a-104N and the authenticator module 102 execute data flow control measures to mitigate data packet drops that can occur due to large bursts of protocol data, e.g., protocol data units (PDUs). As described above, heartbeat messages containing PDUs are multicasted from the supplicants 104a-104N and the authenticator module 102 at a set time interval (e.g., every two seconds). To mitigate these large bursts of protocol data, the supplicants 104a-104N and authenticator module 102 employ pause frames which allow quiescence of the MKA protocol. Accordingly, the achieved quiescence prevents dropping of MKA packets.

As described herein, various non-limiting embodiments provide a large-scale Ethernet mesh network that implements innovative design functions and system operations not found in current mesh network protocol specifications such as, for example, IEEE 802.1X-2010. The innovative functions and operations implemented in the large mesh layer 2 Ethernet network described herein include, but are not limited to, modified uncontrolled ports and modified MACsec common ports, a newly designed IEEE 802.1X-2010 control port state machine, a modified MACsec Key Agreement (MKA) protocol, and a newly designed peer management module, also referred to as an authenticator module. These innovative functions and operations can be performed such that a large mesh layer 2 Ethernet network according to one or more non-limiting embodiments is capable of overcoming the limited number of maximum peer devices (e.g., 30 devices) set by conventional mesh topology protocols (e.g., IEEE 802.1X-2010). Accordingly, the large-scale Ethernet-based mesh network described herein can achieve expected cryptographic performance requirements necessary to perform large-scale mesh networking authentication, key derivation and key distributions for a mesh network containing over one-hundred peer devices.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a hardware controller such as a microcontroller, for example, including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller describe herein refers to an electronic hardware controller including a storage unit capable of storing algorithms, logic or computer executable instruction, and that contains the circuitry necessary to interpret and execute instructions.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A large-scale Ethernet mesh network comprising:
   at least thirty-one authenticated supplicant nodes interconnected in the large-scale Ethernet mesh network;
   a group connectivity association (CA) including said at least thirty-one authenticated supplicant nodes;
   an authenticator module configured to authenticate each of the authenticated supplicant nodes, and to distribute a shared group encryption key to each of the authenticated supplicant nodes;
   wherein each of the authenticated supplicant nodes is configured to encrypt data using the shared group encryption key, and to exchange the encrypted data with any other remaining authenticated supplicant node;
   wherein the authenticator module includes a sender state machine circuit and each authenticated supplicant node includes a receiver state machine circuit, wherein the sender state machine circuit sequentially stores each received shared group encryption key in a sender storage area of the authenticator module, and wherein the receiver state machine circuit sequentially stores each received shared group encryption key in a receiver storage area of the authenticated supplicant node; and
   wherein each of the sender state machine circuit and the receiver state machine circuit transitions from a first received shared group encryption key to a second received shared encryption group key according to a time interval.

2. The large-scale Ethernet mesh network of claim 1, wherein the authenticator module includes a key server configured to generate the shared group encryption key based on a master encryption key.

3. The large-scale Ethernet mesh network of claim 1, wherein the authenticator module distributes a different shared group encryption key in response to detecting a group key change event.

4. The large-scale Ethernet mesh network of claim 3, wherein the group key change event includes a change in a number of authenticated supplicant nodes included in the group CA.

5. The large-scale Ethernet mesh network of claim 3, wherein the group key change event includes detecting a new membership identification number (ID) provided by at least one of the authenticated nodes.

6. The large-scale Ethernet mesh network of claim 5, wherein a previously authenticated supplicant node, having assigned thereto an initial membership ID, receives a new group key and changes the initial membership ID to the new membership ID in response to detecting that the new group key is a reused group key.

7. The large-scale Ethernet mesh network of claim 6, wherein a key server generates a new shared group encryption key in response to detecting the new membership ID provided by the previously authenticated supplicant node.

8. The large-scale Ethernet mesh network of claim 1, wherein the sender state machine circuit actively implements a fixed and configurable back off time interval as the number of authenticated supplicant nodes included in the group CA changes.

9. The large-scale Ethernet mesh network of claim 1, wherein the authenticated supplicant nodes and the authenticator module exchange a protocol data units (PDU) containing a respective membership ID.

10. The large-scale Ethernet mesh network of claim 9, wherein the PDU is generated according to a jumbo frame.

11. The large-scale Ethernet mesh network of claim 10, wherein the jumbo frame has a maximum transmission unit (MTU) greater than 1500 bytes.

12. A method of exchanging secured data in a large-scale Ethernet mesh network, the method comprising:
   authenticating, via an authenticator module, at least thirty-one supplicant nodes to establish a group connectivity association (CA) in the a large-scale Ethernet mesh network;
   distributing, via the authenticator module, a shared group encryption key to each of the authenticated supplicant nodes;
   encrypting data, via at least one sending supplicant node included among the authenticated nodes, using the shared group encryption key;
   and exchanging the encrypted data from the at least one sending supplicant node to at least one receiving supplicant node included among the authenticated nodes;
   wherein the authenticator module includes a sender state machine circuit and each authenticated supplicant node includes a receiver state machine circuit, wherein the sender state machine circuit sequentially stores each received shared group encryption key in a sender storage area of the authenticator module, and wherein the receiver state machine circuit sequentially stores each received shared group encryption key in a receiver storage area of the authenticated supplicant node; and
   wherein each of the sender state machine circuit and the receiver state machine circuit transitions from encrypting the data using a first received shared group encryption key to encrypting the data using a second received shared encryption group key according to a time interval.

13. The method of claim 12, wherein the authenticator module distributes a different shared group encryption key in response to detecting a group key change event.

14. The method of claim 13, wherein the group key change event includes a change in a number of authenticated supplicant nodes included in the group CA.

15. The method of claim 13, wherein the group key change event includes detecting a new membership identification number (ID) provided by at least one of the authenticated nodes.

16. The method of claim 15, wherein a previously authenticated supplicant node, having assigned thereto an initial membership ID, receives a new shared group encryption key and changes the initial membership ID to a new membership ID in response to detecting that the new shared group encryption key is a reused shared group encryption key, and wherein a key server in signal communication with the authenticator module generates a different new shared group encryption key in response to detecting the new membership ID provided by the previously authenticated supplicant node.

* * * * *